United States Patent
Ma et al.

(10) Patent No.: US 12,007,679 B1
(45) Date of Patent: Jun. 11, 2024

(54) MACRO-TO-MICRO TWO-STAGE CAMERA LENS FOCUSING DEVICE BASED ON DIRECT-DRIVE AIR FLOATATION PLATFORM

(71) Applicant: Guangdong University of Technology, Guangzhou (CN)

(72) Inventors: Ping Ma, Guangzhou (CN); Heng Ding, Guangzhou (CN); Hongda Zhao, Guangzhou (CN); Xinghua Wang, Guangzhou (CN)

(73) Assignee: GUANGDONG UNIVERSITY OF TECHNOLOGY, Guangzhou (CN)

( * ) Notice: Subject to any disclaimer, the term of this patent is extended or adjusted under 35 U.S.C. 154(b) by 0 days.

(21) Appl. No.: 18/416,925

(22) Filed: Jan. 19, 2024

(30) Foreign Application Priority Data

Apr. 21, 2023   (CN) .......................... 202310441412.8

(51) Int. Cl.
   *G03B 3/10*   (2021.01)
   *G03B 13/36*  (2021.01)

(52) U.S. Cl.
   CPC ............... *G03B 3/10* (2013.01); *G03B 13/36* (2013.01)

(58) Field of Classification Search
   CPC .................................. G03B 3/10; G03B 13/36
   USPC ....................................................... 359/824
   See application file for complete search history.

(56) References Cited

FOREIGN PATENT DOCUMENTS

| CN | 101770065 A | 7/2010 | |
| CN | 109676403 A | 4/2019 | |
| CN | 110253509 A | 9/2019 | |
| WO | WO-2020151039 A1 * | 7/2020 | ........... G02B 21/002 |

OTHER PUBLICATIONS

WO 2020/151039 A1 (Year: 2020).*
CNIPA, Notification of First Office Action for CN202310441412.8, Oct. 19, 2023.

(Continued)

*Primary Examiner* — William Choi
(74) *Attorney, Agent, or Firm* — Zhigang Ma (57) ABSTRACT

A macro-to-micro two-stage camera lens focusing device based on a direct-drive air floatation platform includes: a two-stage motion device with macro-motion and micro-motion focusing systems. The focusing device includes: a z-direction macro-motion system, a z-direction micro-motion focusing system, and a y-direction micro-motion focusing system. The macro-motion system includes flat-plate linear motors, a tubular linear motor, a tubular elastic balancing device, and an aerostatic air flotation platform; and the micro-motion focusing system includes a micro-motion platform base, piezoceramic actuators, micro-motion flexure hinges, a micro-motion platform, and an industrial camera lens. The focusing device realizes macro-to-micro two-stage focusing, captures a target through rapid motion of the aerostatic air flotation platform and the linear motors to perform coarse focusing, completes the micro-motion focusing by the piezoceramic actuators and the flexure hinges, realizes large-scale, high-speed, high-acceleration, high-precision, and high-stability focusing of two-stage focusing technology, and improves precision and efficiency of industrial measurement.

6 Claims, 6 Drawing Sheets

(56) References Cited

OTHER PUBLICATIONS

Guangdong University of Technology (Applicant), Reply to Notification of First Office Action for CN202310441412.8, w/replacement claims, Nov. 15, 2023.
CNIPA, Notification to grant patent right for invention in CN202310441412.8, Nov. 23, 2023.

* cited by examiner

MACRO-TO-MICRO TWO-STAGE CAMERA LENS FOCUSING DEVICE BASED ON DIRECT-DRIVE AIR FLOATATION PLATFORM

TECHNICAL FIELD

The disclosure relates to the technical field of industrial camera lens focusing devices, particularly to a macro-to-micro two-stage camera lens focusing device based on a direct-drive air floatation platform.

BACKGROUND

In an industrial application, camera lens focusing is to appropriately adjust a focal length of a camera lens according to different distances, and sometimes different camera lenses need to be selected according to characteristics of workpiece. However, when the camera lens is replaced, the focal length of the camera lens needs to be adjusted, thereby making a camera imaging clearer. Mainstream technologies of the camera lens focusing include: screw nut focusing, cam focusing, gear focusing, etc.; and a common method used for the camera lens focusing is implemented by means of a cylindrical cam sleeve. Specially, the cylindrical cam sleeve is rotated relative to a lens barrel of the camera lens, thereby realizing linear motion of the lens barrel; however, the linear motion of the lens barrel needs to cooperate with multi-head threads, which increases friction force, causes wear and tear, and leads to a case where the lens barrel is loosened or stuck. Although there are various focusing types existing in the related art, characteristics of large scale, high speed, high efficiency, high precision, and high stability of the two-stage focusing technology cannot be achieved, and precision and efficiency of industrial measurement cannot be well improved.

SUMMARY

An objective of the disclosure is to provide a macro-to-micro two-stage camera lens focusing device based on a direct-drive air floatation platform, so as to solve the problems existed in the related art. The focusing device according to the disclosure has a function of macro-to-micro two-stage focusing, rapidly captures a target by using an aerostatic air floatation platform and linear motors to realize coarse focusing (also referred as to macro-motion focusing), and then completes a function of micro-motion focusing by using piezoceramic actuators and flexure hinges. Specially, a macro-motion system can move at a speed of 1 meter per second (m/s), and a micro-motion focusing system can achieve a maximum precision of 20 nanometers (nm). Therefore, the disclosure fully takes advantages of the aerostatic air floatation platform, flat-plate linear motors, a tubular linear motor, piezoelectric actuators (referred as to piezoceramic actuators), and flexure hinges, and then focusing function of an industrial camera lens can be quickly and stably completed by the disclosure in cooperation with a servo control technology.

In order to achieve the above objective, the disclosure provides the following solution: a macro-to-micro two-stage camera lens focusing device based on a direct-drive air floatation platform, which is configured to be mounted on a y axis of an aerostatic air floatation platform and includes:

a base, configured to be disposed on the y axis of the aerostatic air floatation platform;

a z-direction macro-motion system, disposed on the base, the z-direction macro-motion system being configured to realize macro-motion focusing of an industrial camera lens along a z direction;

a micro-motion focusing system, including: a z-direction micro-motion focusing system and a y-direction micro-motion focusing system; the z-direction micro-motion focusing system being disposed above the z-direction macro-motion system, and the y-direction micro-motion focusing system being disposed above the z-direction micro-motion focusing system; each of the z-direction micro-motion focusing system and the y-direction micro-motion focusing system adopting a structure combining rigid arms and flexible arms; and the z-direction micro-motion focusing system and the y-direction micro-motion focusing system being configured to realize micro-motion focusing along the z direction and a y direction, respectively.

In an embodiment, the z-direction micro-motion focusing system includes:

a micro-motion platform, slidably connected to the base;

a micro-motion platform base, fixedly connected to the micro-motion platform;

a z-direction micro-motion flexure hinge, fixedly disposed on the micro-motion platform base;

a z-direction piezoceramic actuator, fixedly disposed in the z-direction micro-motion flexure hinge; a top portion of the z-direction piezoceramic actuator being configured to push the z-direction micro-motion flexure hinge to perform nanoscale motion through a piezoelectric effect, thereby completing the micro-motion focusing along the z direction; and the industrial camera lens, disposed on the z-direction micro-motion flexure hinge.

In an embodiment, the y-direction micro-motion focusing system includes:

a y-direction micro-motion flexure hinge, fixedly disposed on the micro-motion platform and fixedly connected to the micro-motion platform base;

a y-direction piezoceramic mounting base, fixedly disposed on the micro-motion platform;

a y-direction piezoceramic actuator, fixedly disposed in the y-direction piezoceramic mounting base; the y-direction piezoceramic actuator being configured to make the micro-motion platform base generate a micro displacement along the y direction by pushing a side of the micro-motion platform base, thereby causing the industrial camera lens disposed on the micro-motion platform base to produce the micro-motion focusing along the y direction; and two y-direction micro-motion guideways, fixedly disposed on the micro-motion platform, the micro-motion platform base being fixedly disposed on the two y-direction micro-motion guideways to complete an installation of the micro-motion platform that is disposed along the z direction, and the micro-motion platform that is disposed along the z direction being configured to perform micro motion along the y direction through the two y-direction micro-motion guideways.

In an embodiment, the y-direction piezoceramic actuator and the y-direction micro-motion flexure hinge are disposed perpendicular to the micro-motion platform base.

In an embodiment, the micro-motion platform base includes: a body; a bottom of the body defines two first rabbets, and the two first rabbets are disposed corresponding to the two y-direction micro-motion guideways; a top portion of the body defines a cylindrical positioning groove, and the z-direction piezoceramic actuator is disposed in the cylindrical positioning groove; the top portion of the body further defines two second rabbets, the two second rabbets are symmetrically disposed on two sides of the cylindrical positioning groove, and the two second rabbets are designed according to a shape of the z-direction micro-motion flexure hinge; and a middle portion of the body defines a third rabbet, and a z-direction micro-motion guideway is fixedly disposed in the third rabbet.

In an embodiment, the z-direction micro-motion flexure hinge includes:
 a first rigid arm;
 two second rigid arms, symmetrically disposed on two sides of the first rigid arm;
 four bridge-typed flexure hinges, two of the four bridge-typed flexure hinges being fixedly connected between a side wall of the first rigid arm and one of the two second rigid arms, and remaining two of the four bridge-typed flexure hinges being fixedly connected between another side wall of the first rigid arm and the other second rigid arm; and
 a bottom of the first rigid arm being fixedly connected to the z-direction micro-motion guideway, the z-direction micro-motion guideway being fixedly disposed in the third rabbet, the first rigid arm defining a groove thereon, which is disposed corresponding to the cylindrical positioning groove, the z-direction piezoceramic actuator being embedded in a cavity defined by the groove and the cylindrical positioning groove; and the two second rigid arms being fixedly connected to the two second rabbets, respectively.

In an embodiment, the y-direction micro-motion flexure hinge includes:
 an inner rigid arm, fixedly connected to the micro-motion platform;
 an outer rigid arm, a side of the outer rigid arm being fixedly connected to the y-direction piezoceramic actuator, and the side of the outer rigid arm being fixedly connected to the side of the micro-motion platform base; and
 four s-shaped flexure hinges, two of the four s-shaped flexure hinges being fixedly connected between a side wall of the inner rigid arm and an inner side wall of the outer rigid arm, and remaining two of the four s-shaped flexure hinges being fixedly connected between another side wall of the inner rigid arm and the inner side wall of the outer rigid arm; and the four s-shaped flexure hinges being disposed symmetrically in pairs.

In an embodiment, the z-direction macro-motion system includes:
 a supporting guideway assembly, a tubular linear motor, and a tubular elastic balancing device, which are fixedly connected to the base;
 the micro-motion platform being slidably connected to the supporting guideway assembly, and the supporting guideway assembly being staggered with the tubular linear motor and the tubular elastic balancing device; and
 the supporting guideway assembly including: a guideway I and a guideway II, which are fixedly connected to the micro-motion platform; the tubular linear motor being disposed between the guideway I and the guideway II; and the tubular elastic balancing device being disposed close to the guideway I.

In an embodiment, an elastic anti-collision limit block group is fixedly connected to the guideway I and the guideway II; the elastic anti-collision limit block group includes: an elastic anti-collision limit block I, an elastic anti-collision limit block II, an elastic anti-collision limit block III, and an elastic anti-collision limit block IV, which are fixedly connected to the micro-motion platform; and the elastic anti-collision limit block I and the elastic anti-collision limit block IV are fixedly connected to two ends of the guideway I, respectively; and the elastic anti-collision limit block II and the elastic anti-collision limit block III are fixedly connected to two ends of the guideway II, respectively.

In an embodiment, a mounting base is fixedly connected to the z-direction micro-motion flexure hinge, and the industrial camera lens is disposed on the mounting base.

The disclosure has the following technical effects. The camera lens focusing device (i.e., the macro-to-micro two-stage camera lens focusing device) according to the disclosure focuses through a manner of the macro-to-micro two-stage focusing. Specially, measuring components are disposed on an x axis of the aerostatic air flotation platform, the y axis of the aerostatic air flotation platform cooperates with the linear motors to realize the first-stage macro coarse focusing of the industrial camera lens along the y direction, and the z-direction macro-motion system can realize the macro-motion focusing of the industrial camera lens along the z direction, i.e., the first-stage focusing of the industrial camera lens can be completed rapidly and stably. Meanwhile, the disclosure further provides the z-direction micro-motion focusing system and the y-direction micro-motion focusing system, both of which adopt the structure combining rigid arms and flexible arms, so that the z-direction micro-motion focusing system and the y-direction micro-motion focusing system can realize the micro-motion focusing along the z direction and the y direction, respectively. Therefore, the disclosure can achieve the second-stage micro-motion focusing of the industrial camera lens. In general, the focusing device provided by the disclosure realizes large-scale, high-speed, high-acceleration, high-precision, and high-stability focusing in the two-stage focusing technology, thereby improving the precision and efficiency of industrial measurement.

BRIEF DESCRIPTION OF DRAWINGS

In order to more clearly illustrate embodiments of the disclosure or technical solutions in the related art, attached drawings that need to be used in the embodiments are briefly described below. Apparently, the attached drawings in the following description are merely some of the embodiments according to the disclosure, and those skilled in the related art may obtain other drawings according to the attached drawings without involving any inventive effort.

DESCRIPTION OF REFERENCE NUMERALS

1-x axis of an aerostatic air flotation platform; 2-y axis of the aerostatic air flotation platform; 3-z axis; 4-triangular pillar; 5-y-axis flat-plate linear motor; 6-x-axis base; 7-x-axis flat-plate linear motor; 8-y-axis base; 9-tubular linear motor; 10-base; 11A-guideway I; 11B-guideway II; 12-tubular elastic balancing device; 13-micro-motion platform; 14-micro-motion platform base; 141-body; 142-first rabbet; 143-cylindrical positioning groove; 144-second rabbet; 145-third rabbet; 15-industrial camera lens; 16-z-direction micro-motion flexure hinge; 161-first rigid arm; 162-second rigid arm; 163-bridge-typed flexure hinge; 17-z-direction piezoceramic actuator; 18A-elastic anti-collision limit block I; 18B-elastic anti-collision limit block II; 18C-elastic anti-collision limit block III; 18D-elastic anti-collision limit block IV; 19-y-direction piezoceramic actuator; 20-y-direction micro-motion flexure hinge; 201-inner rigid arm; 202-outer rigid arm; 203-s-shaped flexure hinge; 21-connecting plate; 22-mounting base; 23-y-direction micro-motion guideway; 24-y-direction piezoceramic mounting base; 25-z-direction micro-motion guideway.

DETAILED DESCRIPTION OF EMBODIMENTS

The technical solutions in the embodiments of the disclosure will be clearly and completely described below with reference to the attached drawings in the embodiments of the disclosure. All other embodiments obtained by those skilled in the related art based on the embodiments of the disclosure without creative efforts shall fall within the scope of the protection of the disclosure.

In order to make the above objects, features and advantages of the disclosure more comprehensible, the disclosure will be further described in detail below with reference to the attached drawings and illustrated embodiments.

With reference to FIGS. 1-6, the disclosure provides a macro-to-micro two-stage camera lens focusing device based on a direct-drive air floatation platform, the macro-to-micro two-stage camera lens focusing device is configured to be mounted on a y axis 2 of an aerostatic air flotation platform, the macro-to-micro two-stage camera lens focusing device includes a base 10 configured to be disposed on the y axis 2 of the aerostatic air flotation platform. Specially, the base 10 is configured to be vertically mounted on the y axis 2 of the aerostatic air flotation platform by means of a connecting plate 21. When a y-axis flat-plate linear motor 5 disposed on the y axis 2 of the aerostatic air flotation platform drives the y axis 2 of the aerostatic air flotation platform to move along a y direction, the connecting plate 21 moves in a positive direction with the y axis 2 of the aerostatic air flotation platform, and then the y axis 2 of the aerostatic air flotation platform cooperates with an x axis 1 of the aerostatic air flotation platform to facilitate an industrial camera lens 15 to find and position a target, thereby realizing a first-stage coarse focusing motion control of automatic focusing of the industrial camera lens 15 and forming the first-stage camera lens focusing of a large stroke.

Figure 1:
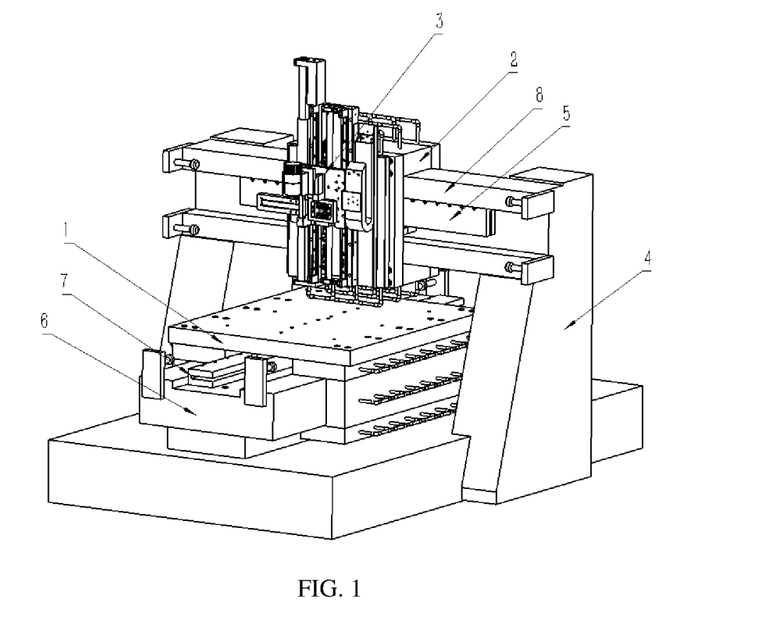
FIG. 1 illustrates an axonometric schematic diagram of a macro-to-micro two-stage camera lens focusing device mounted on an aerostatic air flotation platform according to the disclosure.
Figure 2:
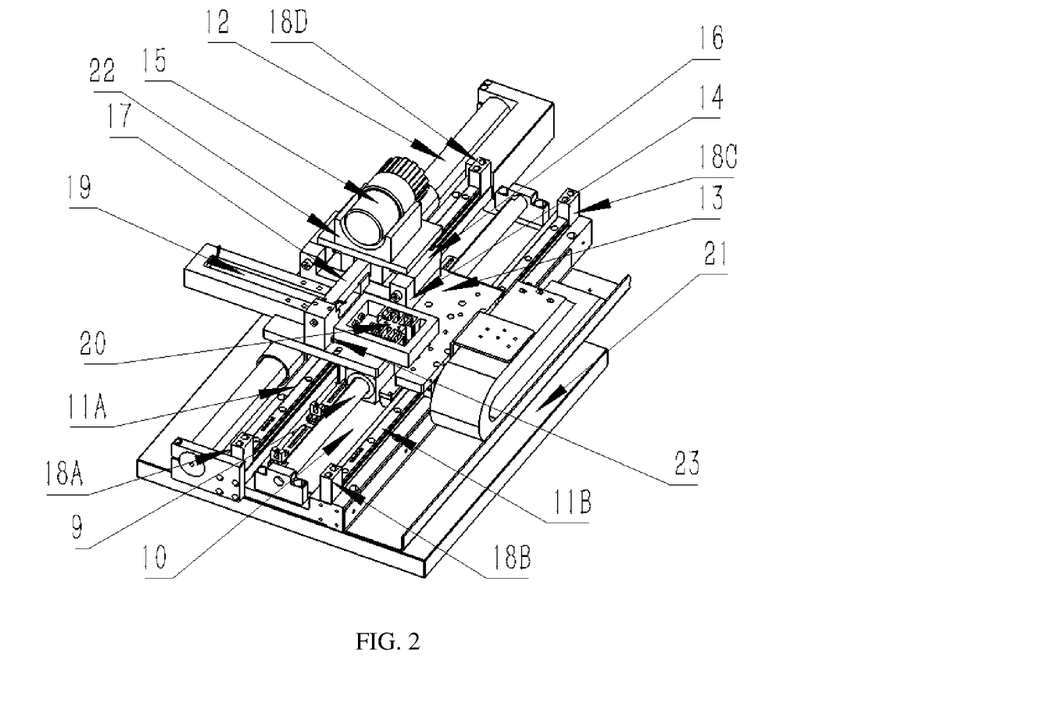
FIG. 2 illustrates an axonometric schematic structural diagram of the macro-to-micro two-stage camera lens focusing device according to the disclosure.
Figure 6:
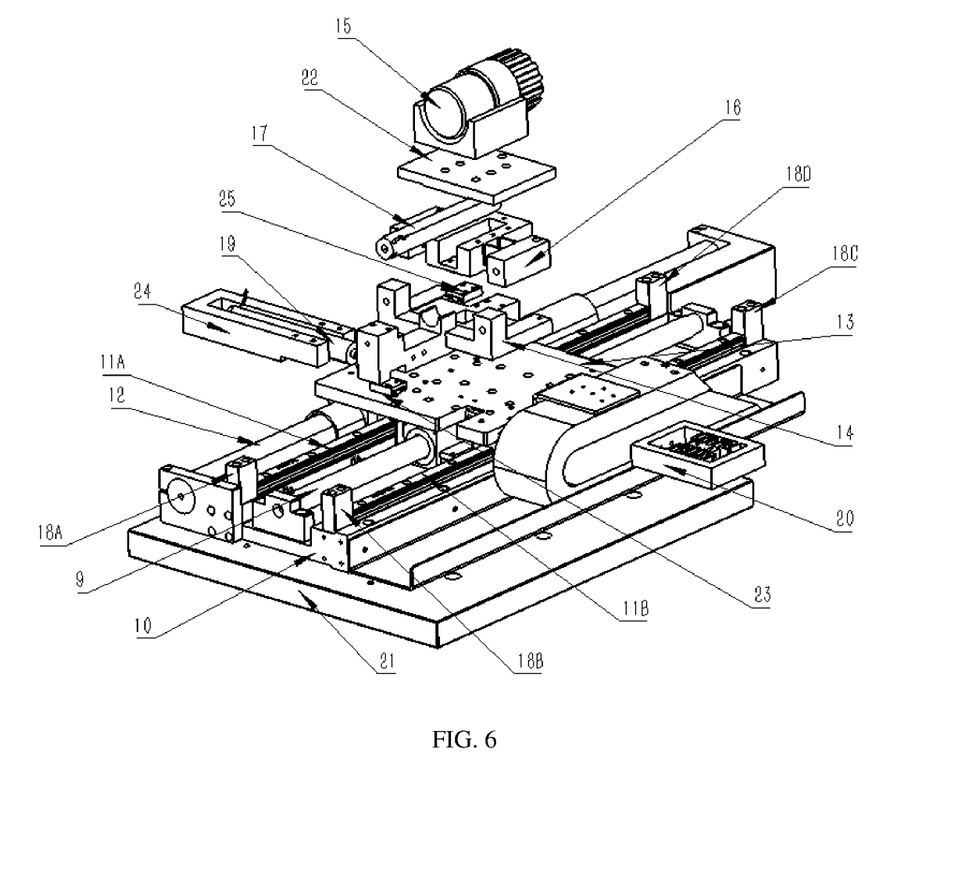
FIG. 6 illustrates an exploded structural view of the macro-to-micro two-stage camera lens focusing device according to the disclosure.

The macro-to-micro two-stage camera lens focusing device according to the disclosure further includes a z-direction macro-motion system mounted on the base 10, and the z-direction macro-motion system can realize macro-motion focusing of the industrial camera lens 15 along a z direction.

The macro-to-micro two-stage camera lens focusing device according to the disclosure further includes a micro-motion focusing system, including: a z-direction micro-motion focusing system and a y-direction micro-motion focusing system. The z-direction micro-motion focusing system is mounted above the z-direction macro-motion system, and the y-direction micro-motion focusing system is mounted above the z-direction micro-motion focusing system. Each of the z-direction micro-motion focusing system and the y-direction micro-motion focusing system adopts a structure combining rigid arms and flexible arms, and the z-direction micro-motion focusing system and the y-direction micro-motion focusing system can realize micro-motion focusing along the z direction and the y direction, respectively.

Specially, with reference to FIG. 1, FIG. 2, and FIG. 6, the aerostatic air flotation platform includes a bottom mounting base (not illustrated in the attached drawings); two sides of the bottom mounting base are fixedly connected to triangular pillars 4, respectively; the bottom mounting base is fixedly connected to an x-axis base 6; and the x-axis base 6 is fixedly connected to an x-axis flat-plate linear motor 7. In order to save an installation space and facilitate the installation of the x-axis flat-plate linear motor 7, the x-axis base 6 defines a concave structure, and the x-axis flat-plate linear motor 7 is embedded in the concave structure, but structures disposed on two sides of the x-axis base 6 are higher than a structure disposed in a middle portion of the x-axis base 6, so that the structures disposed on two sides of the x-axis base 6 higher than the structure disposed in the middle portion of the x-axis base 6 have a guiding effect, an x-axis platform where the x axis 1 of the aerostatic air flotation platform is located can be driven according to centre of mass, and driven precision and motion stability along an x direction are improved. An output shaft of the x-axis flat-plate linear motor 7 is fixedly connected to the x axis 1 of the aerostatic air flotation platform, and two ends of the x axis 1 of the aerostatic air flotation platform are slidably connected to two ends of the x-axis base 6. A y-axis base 8 is fixedly connected between the two triangular pillars 4, and the y axis 2 of the aerostatic air flotation platform is slidably connected to the y-axis base 8. A concave structure is defined on the y-axis base 8, and the y-axis flat-plate linear motor 5 is embedded in the concave structure. Similarly, in order to save an installation space and facilitate the installation of the y-axis flat-plate linear motor 5, structures disposed on two sides of the y-axis base 8 are higher than a structure disposed in a middle portion of the y-axis base 8, so that the structures disposed on two sides of the y-axis base 8 higher than the structure disposed in the middle portion of the y-axis base 8 have a guiding effect, a y-axis platform where the y axis 2 of the aerostatic air flotation platform is located can be driven according to centre of mass, and driven precision and motion stability along the y direction are improved. A z axis 3 of a tubular linear motor 9 is fixedly connected to the y axis 2 of the aerostatic air flotation platform, and specially, the triangular pillars 4 and the y-axis base 8 of the aerostatic air flotation platform forms a fixed gantry structure. Therefore, when the x axis 1 of the aerostatic air flotation platform and the y axis 2 of the aerostatic air flotation platform adopt the fixed gantry structure, the x axis 1 of the aerostatic air flotation platform and the y axis 2 of the aerostatic air flotation platform will not influence each other during their motion, and the y axis 2 of the aerostatic air flotation platform disposed on a crossbeam of the fixed gantry structure is provided with the z axis 3 mounted with the industrial camera lens 15 and driven by the tubular linear motor 9, so that the x axis 1 of the aerostatic air flotation platform, the y axis 2 of the aerostatic air flotation platform, and the z axis 3 realize a three-axis linkage. When the focusing device is used, XY aerostatic bearings (not illustrated in the attached drawings) on the x axis 1 of the aerostatic air flotation platform and the y axis 2 of the aerostatic air flotation platform can form air films on the motion platform in the x direction and the y direction, so that mechanical transmission friction can be eliminated, and the y axis 2 of the aerostatic air flotation platform drives the industrial camera lens 15 of the z axis 3 to rapidly capture the detected target located on the x axis 1 of the aerostatic air flotation platform. In addition, the macro-to-micro two-stage camera lens focusing device according to the disclosure includes the z-direction macro-motion system, so that the first-stage macro-motion coarse focusing of the industrial camera lens 15 in three directions of the x direction, the y direction, and the z direction can be ensured. The macro-to-micro two-stage camera lens focusing device according to the disclosure further includes the z-direction micro-motion focusing system and the y-direction micro-motion focusing system, both of which adopt the structure combining the rigid arms and the flexible arms, so that the z-direction micro-motion focusing system and the y-direction micro-motion focusing system can realize the micro-motion focusing along the z direction and the y direction, respectively, i.e., realizing the two-stage micro-motion focusing of the industrial camera lens 15 along the y direction and the z direction. The macro-to-micro two-stage camera lens focusing device adopts the manner of macro-to-micro two-stage focusing in combination with a unique two-dimensional driven micro-motion platform structure combining the rigid arms and the flexible arms, thereby realizing large-scale, high-speed, high-acceleration, high-precision, and high-stability focusing in the two-stage focusing technology and can improving the precision and efficiency of industrial measurement.

In an illustrated embodiment, the z-direction micro-motion focusing system includes: a micro-motion platform 13 slidably connected to the base 10; a micro-motion platform base 14 fixedly connected to the micro-motion platform 13; a z-direction micro-motion flexure hinge 16 fixedly disposed on the micro-motion platform base 14; a z-direction piezoceramic actuator 17 fixedly disposed in the z-direction micro-motion flexure hinge 16; a top portion of the z-direction piezoceramic actuator 17 being configured to push the z-direction micro-motion flexure hinge 16 to perform nanoscale motion through a piezoelectric effect, thereby completing the micro-motion focusing along the z direction of the z axis 3; and the industrial camera lens 15 disposed on the z-direction micro-motion flexure hinge 16. Specially, a mounting base 22 is fixedly connected to the z-direction micro-motion flexure hinge 16, the industrial camera lens 15 is disposed on the mounting base 22, and the mounting base 22 is locked on the z-direction micro-motion flexure hinge 16 by means of a bolt.

In an illustrated embodiment, the y-direction micro-motion focusing system includes: a y-direction micro-motion flexure hinge 20 and a y-direction piezoceramic mounting base 24 that are fixedly mounted on the micro-motion platform 13; the y-direction micro-motion flexure hinge 20 is fixedly connected to the y-direction piezoceramic mounting base 24; and a y-direction piezoceramic actuator 19 is configured to make the micro-motion platform base 14 generate a micro displacement along the y direction by pushing a side of the micro-motion platform base 14, thereby causing the industrial camera lens 15 disposed on the micro-motion platform base 14 to produce the micro-motion focusing along the y direction.

Moreover, two y-direction micro-motion guideways 23 are fixedly disposed on the micro-motion platform 13, the micro-motion platform base 14 is fixedly disposed on the two y-direction micro-motion guideways 23 to complete an installation of the z-direction micro-motion focusing system, and the z-direction micro-motion focusing system is configured to perform micro motion along the y direction through the two y-direction micro-motion guideways 23.

In addition, the y-direction piezoceramic actuator 19 and the y-direction micro-motion flexure hinge 20 are disposed perpendicular to the micro-motion platform base 14.

Specially, with reference to FIG. 2, FIG. 4, FIG. 5, and FIG. 6, while installing the macro-to-micro two-stage camera lens focusing device according to the disclosure, the micro-motion platform 13 is firstly slidably connected to the z-direction macro-motion focusing system, the two y-direction micro-motion guideways 23 are then fixedly connected to the micro-motion platform 13, and then the micro-motion platform base 14 is arranged on the two y-direction micro-motion guideways 23; second rigid arms 162 of the z-direction micro-motion flexure hinge 16 are fixedly mounted on the micro-motion platform base 14, the second rigid arms 162 are fixedly mounted on a z-direction micro-motion guideway 25, and then the z-direction micro-motion guideway 25 is fixedly mounted in a groove of the micro-motion platform base 14; and a cavity defined by the z-direction micro-motion flexure hinge 16 and the micro-motion platform base 14 installs the z-direction piezoceramic actuator 17. When the z-direction micro-motion focusing is required, the z-direction piezoceramic actuator 17 is energized to generate the piezoelectric effect to push the z-direction micro-motion flexure hinge 16 to move, and then the z-direction micro-motion flexure hinge 16 can perform nanoscale motion along the z direction by means of its deformation, so that the industrial camera lens 15 can be driven to perform the micro-motion focusing along the z direction. Moreover, when the micro-motion focusing along the y direction is required, the y-direction piezoceramic actuator 19 is energized to generate piezoelectric effect to make the y-direction micro-motion flexure hinge 20 deform. At the same time, due to the fact that the y-direction piezoceramic actuator 19 and the y-direction micro-motion flexure hinge 20 are disposed perpendicular to the micro-motion platform base 14, the y-direction piezoceramic actuator 19 makes the micro-motion platform base 14 generate the micro displacement along the y direction by pushing the side of the micro-motion platform base 14, thereby causing the industrial camera lens 15 disposed on the micro-motion platform base 14 to produce the micro-motion focusing along the y direction. The z-direction micro-motion flexure hinge 16 and the y-direction micro-motion flexure hinge 20 both adopt the structure combining the rigid arms and the flexible arms, so that they can generate nanoscale elastic tiny deformation; and due to self-recovery characteristics of the z-direction micro-motion flexure hinge 16 and the y-direction micro-motion flexure hinge 20, idle stroke and mechanical friction during transmission are eliminated, and ultra-high displacement resolution can be obtained. In addition, the z-direction piezoceramic actuator 17 and the y-direction piezoceramic actuator 19 have characteristics of large output, high resonant frequency, high precision, etc., and therefore can perform high-frequency excitation vibration with more than kilohertz (kHz), and also can generate the nanoscale micro displacement. The z-direction piezoceramic actuator 17 is used as a power source, so that the z-direction micro-motion flexure hinge 16 generates a nanoscale deformation, and then the nanoscale displacement along the z direction is formed through the z-direction micro-motion guideway 25; and at the same time, the y-direction piezoceramic actuator 19 is also used as a power source, the micro-motion platform base 14 is pushed to enable the y-direction micro-motion flexure hinge 20 to generate a nanoscale deformation, and then a nanoscale displacement is formed through the two y-direction micro-motion guideways 23. Therefore, the combined motion through the z-direction micro-motion guideway and the y-direction micro-motion guideways 23 can produce the displacements with the highest accuracy of 20 nanometers (nm) along the y direction and the z direction.

Figure 5:
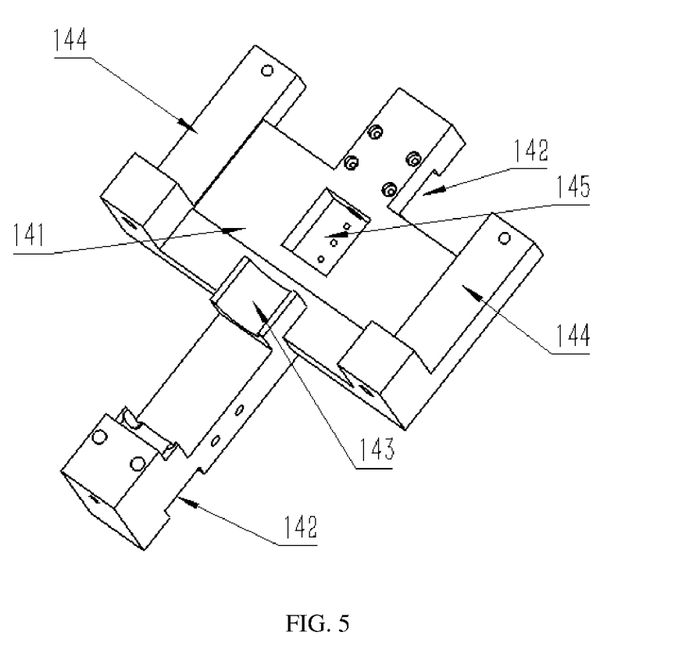
FIG. 5 illustrates a structural diagram of a micro-motion platform base according to the disclosure.

In an illustrated embodiment, the micro-motion platform base 14 includes: a body (141); a bottom of the body 141 defines two first rabbets 142, and the two first rabbets 142 are disposed corresponding to the two y-direction micro-motion guideways 23.

A top portion of the body 141 defines a cylindrical positioning groove 143, and the z-direction piezoceramic actuator 17 is disposed in the cylindrical positioning groove 143.

The top portion of the body 141 further defines two second rabbets 144, the two second rabbets 144 are symmetrically disposed on two sides of the cylindrical positioning groove 143, and the two second rabbets 144 are designed according to a shape of the z-direction micro-motion flexure hinge 16.

A middle portion of the body 141 defines a third rabbet 145, and the z-direction micro-motion guideway 25 is fixedly disposed in the third rabbet 145.

Figure 4:
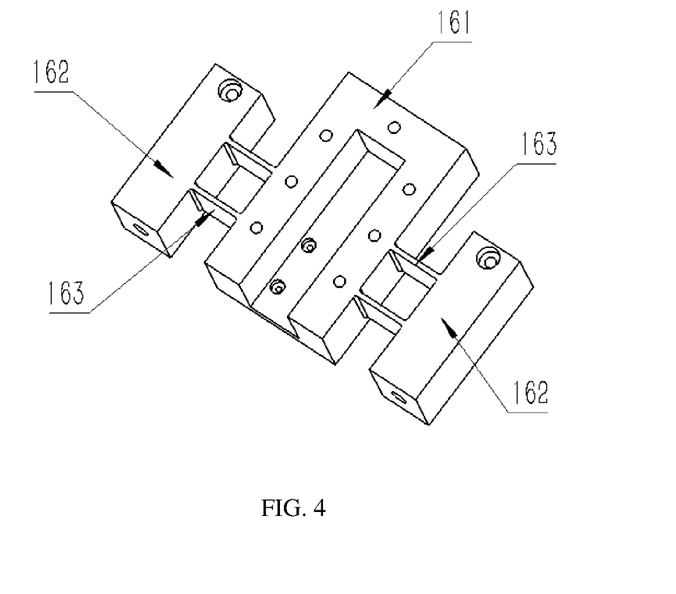
FIG. 4 illustrates a schematic structural diagram of a z-direction micro-motion flexure hinge according to the disclosure.

In an illustrated embodiment, the z-direction micro-motion flexure hinge 16 includes: a first rigid arm 161, two second rigid arms 162 symmetrically disposed on two sides of the first rigid arm 161, bridge-typed flexure hinges 163, two of which are fixedly connected between a side wall of the first rigid arm 161 and one of the two second rigid arms 162, and remaining two of which are fixedly connected between another side wall of the first rigid arm 161 and the other second rigid arm 162; and a bottom of the first rigid arm 161 is fixedly connected to the top portion of the body 141, a groove is defined in the first rigid arm 161, the groove is disposed corresponding to the cylindrical positioning groove 143, and the z-direction piezoceramic actuator 17 is embedded in the cavity formed by the groove and the cylindrical positioning groove 143.

Specifically, with reference to FIG. 5, the two first rabbets 142 are defined in the bottom of the body 141, and the two first rabbets 142 can be mounted on the two y-direction micro-motion guideways 23 disposed in parallel to complete the precise micro-motion displacement along the y direction; the cylindrical positioning groove 143 is formed in the middle portion of the body 141 to accurately mount the z-direction piezoceramic actuator 17, thereby ensuring the output point of the z-direction piezoceramic actuator 17 can be accurately located in a center of the first rigid arm 161 disposed in the middle portion of the z-direction micro-motion flexure hinge 16; the two second rabbets 144 are disposed on two ends of the body 141, and the two second rabbets 144 are L-shaped rabbets, which can accurately position the z-direction micro-motion flexure hinge 16 and ensure precision and convenience for installing the z-direction micro-motion flexure hinge 16; and the third rabbet 145 is formed in the middle portion of the body 141, is used for mounting the z-direction micro-motion guideway 25, and is connected to the z-direction micro-motion flexure hinge 16, thereby ensuring the motion precision of the z-direction micro-motion flexure hinge 16.

With reference to FIG. 4, the z-direction micro-motion flexure hinge 16 adopts 7075 aluminum alloy and has high strength; the two second rigid arms 162 disposed on left and right sides of the z-direction micro-motion flexure hinge 16 are locked on the micro-motion platform base 14 by using bolts to ensure that the z-direction micro-motion flexure hinge 16 does not move in a large scale, and the two second rigid arms 162 are connected to the first rigid arm 161 in the middle portion of the z-direction micro-motion flexure hinge 16 through four bridge-typed flexure hinges 163. The first rigid arm 161 is mounted with the mounting base 22, and defines the groove to cooperated with the cylindrical positioning groove 143 of the micro-motion platform base 14 to accurately position the z-direction piezoceramic actuator 17, so that the output point of the z-direction piezoceramic actuator 17 is accurately located in the center of the first rigid arm 161. Therefore, the focusing device can only generate the micro displacement along the z direction and eliminates deflection along the y direction. Moreover, the micro displacement along the z direction of the first rigid arm 161 is transmitted to the four bridge-typed flexure hinges 163 to deform, thereby completing the precise nanoscale displacement. In addition, the symmetrical structure of the four bridge-typed flexure hinges 163 enables the four bridge-typed flexure hinges 163 to generate a translational and stable output displacement; and the four bridge-typed flexure hinges 163 are used to connect to three rigid arms (i.e., the first rigid arm 161 and the two second rigid arms 162) without setting intermediate transmission mechanisms, which can eliminate mechanical friction; and the deformations of the four bridge-typed flexure hinges 163 can obtain the ultra-high displacement resolution.

Figure 3:
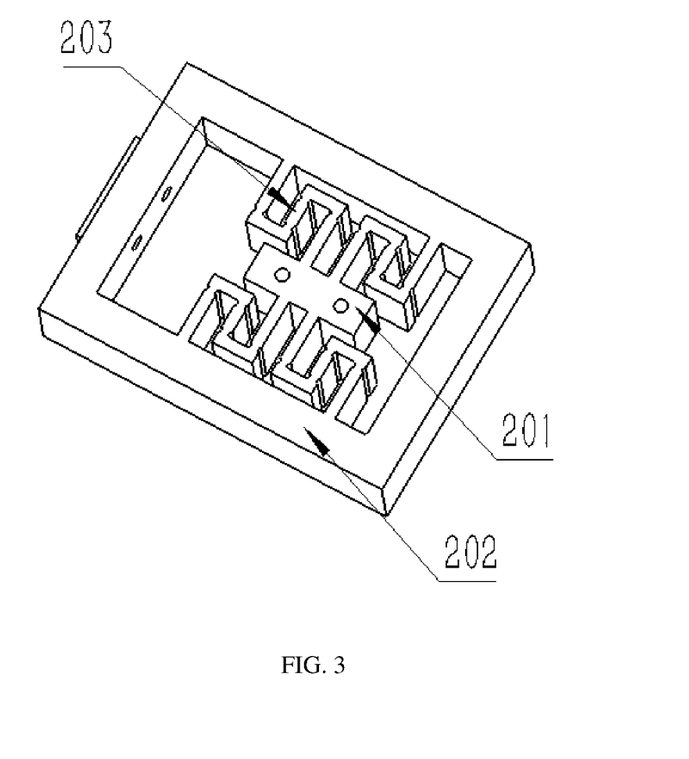
FIG. 3 illustrates a schematic structural diagram of a y-direction micro-motion flexure hinge according to the disclosure.

In an illustrated embodiment, the y-direction micro-motion flexure hinge 20 includes: an inner rigid arm 201 and an outer rigid arm 202; the inner rigid arm 201 is fixedly connected to the micro-motion platform 13, a side of the outer rigid arm 202 is fixedly connected to the side of the micro-motion platform base 14; and four s-shaped flexure hinges 203, two of which are fixedly connected between a side wall of the inner rigid arm 201 and an inner side wall of the outer rigid arm 202, and remaining two of the four s-shaped flexure hinges 203 are fixedly connected between another side wall of the inner rigid arm 201 and the inner side wall of the outer rigid arm 202; and the four s-shaped flexure hinges 203 are disposed symmetrically in pairs.

Specifically, with reference to FIG. 3, the y-direction micro-motion flexure hinge 20 adopts 7075 aluminum alloy and has high strength. The four s-shaped flexure hinges 203 are disposed symmetrically in pairs, and the four s-shaped flexure hinges 203 are used to connect to the inner rigid arm 201 and the outer rigid arm 202. The inner rigid arm 201 is locked on the micro-motion platform 13 by using a bolt to ensure that the y-direction micro-motion flexure hinge 20 does not move in a large scale; and the outer rigid arm 202 is locked on the side of the micro-motion platform base 14 by using a bolt to ensure the micro displacement along the y direction to act on the outer rigid arm 202 and not to move the inner rigid arm 201. Namely, the four s-shaped flexure hinges 203 generate the deformations to enable the outer rigid arm 202 relatively move, and then to output the precision nanoscale displacement along the y direction. At the same time, the four s-shaped flexure hinges 203 are provided with rounding angles at corners thereof to prevent stress concentration and improve the strength of the y-direction micro-motion flexure hinge 20. Moreover, the symmetrical structure enables the four bridge-typed flexure hinges 163 to generate the translational and stable output displacement; the four bridge-typed flexure hinges 163 connect to the first rigid arm 161 and the two second rigid arms 162 without setting the intermediate transmission mechanisms can eliminate the mechanical friction; and the four bridge-typed flexure hinges 163 can eliminate interference motion along the z direction and output the precise motion along the y direction.

In an illustrated embodiment, the z-direction macro-motion system includes: a supporting guideway assembly, a tubular linear motor 9, and a tubular elastic balancing device 12, which are fixedly connected to the base 10; the micro-motion platform 13 is slidably connected to the supporting guideway assembly, and the supporting guideway assembly is staggered with the tubular linear motor 9 and the tubular elastic balancing device 12.

The supporting guideway assembly includes: a guideway I 11A and a guideway II 11B, which are fixedly connected to the micro-motion platform 13; the tubular linear motor 9 is disposed between the guideway I 11A and the guideway I 11B; and the tubular elastic balancing device 12 is disposed close to the guideway I 11A.

Specifically, with reference to FIG. 2, the tubular linear motor 9 is used for driving the focusing device provided by the disclosure to improve dynamic response performance and positioning precision, thereby realizing high-frequency, high-speed, and high-precision motion control; and the tubular linear motor 9 cooperates with the guideway I 11A and the guideway II 11B, as well as the tubular elastic balancing device 12 to realize the function of macro-motion focusing along the z direction. The tubular elastic balancing device 12 can ensure the z axis 3, the macro and micro platforms to automatically return to their original positions after the focusing device provided by the disclosure fails to be powered, thereby ensuring safety of the focusing device. The tubular linear motor 9 is placed between the guideway I 11A and the guideway II 11B; the guideway I 11A and the guideway II 11B are precise linear guideways; and the guideway I 11A and the guideway II 11B are symmetrically placed. The tubular linear motor 9 does not laterally disconnect, thereby not weakening a magnetic field at a boundary of the tubular linear motor 9, and a magnetic field of the tubular linear motor 9 is uniformly distributed in a circumferential direction, so that electromagnetic force is uniform, which makes the tubular linear motor 9 moves stably. The tubular linear motor 9 is cylindrical, and the z axis 3 is precisely driven by the tubular linear motor 9 according centre of mass of the z axis, so that macro motion of the z axis 3 can be more stable. Gravity of the z axis 3 and gravity of the micro-motion focusing system (i.e., the z-direction micro-motion focusing system and the y-direction micro-motion focusing system) are balanced by using the tubular elastic balancing device 12; and therefore the gravity and elastic force of the z axis 3 are kept balanced under a balanced state and a non-energized state of the focusing device provided by the disclosure, so that the position precision and stability of the z axis 3 are ensured, and the z axis 3 and the micro-motion device are safe and stable in the non-energized state of the focusing device.

In an illustrated embodiment, an elastic anti-collision limit block group is fixedly connected to the guideway I 11A and the guideway II 11B; the elastic anti-collision limit block group includes: an elastic anti-collision limit block I 18A, an elastic anti-collision limit block II 18B, an elastic anti-collision limit block III 18C, and an elastic anti-collision limit block IV 18D, which are fixedly connected to the micro-motion platform 13; and the elastic anti-collision limit block I 18A and the elastic anti-collision limit block IV 18D are fixedly connected to two ends of the guideway I 11A, respectively; and the elastic anti-collision limit block II 18B and the elastic anti-collision limit block III 18C are fixedly connected to two ends of the guideway II 11B, respectively.

Specifically, with reference to FIG. 2, when the micro-motion platform 13 moves, the elastic anti-collision limit block group keeps the micro-motion platform 13 within a normal motion range, achieving a damping effect.

The vertical two-dimensional macro-to-micro motion platform structure based on the air flotation platform provided by the disclosure provides a basis for various requirements in the field of macro and micro motion, takes advantages of the linear motors, i.e., large stroke, high precision, etc., to drive the macro motion, and is used as the first-stage coarse focusing device. Then, the disclosure takes advantages of the micro-motion platform combining the piezoceramic actuators and the flexure hinges, i.e., high precision and high resolution as micro-compensation, and the micro-motion platform is used to drive a second-stage micro-motion focusing. In this way, the problem of low precision of the first-stage focusing is solved, thereby achieving the technical solution of high-precision camera lens focusing. The disclosure realizes the two-stage focusing device for the industrial camera lens 15 from the coarse adjustment to the micro adjustment, which makes the industrial camera lens 15 imaging clearer and possesses a wider focusing range. Therefore, the disclosure is suitable for complex visual systems that require high precision, large stroke, micro-motion focusing, and multiple times of focusing.

Specifically, in the macro-to-micro two-stage camera lens focusing device according to the disclosure, an x-direction macro-motion system and a y-direction macro-motion system are composed of the aerostatic air flotation platform driven by the linear motors, both of which also adopt the fixed gantry structures, so that the x axis 1 of the aerostatic air flotation platform and the y axis 2 of the aerostatic air flotation platform can realize large-stroke, high-speed, high-acceleration, and precise motion, as well as good vibration isolation and strong operation stability. Furthermore, the x-axis base 6 and the y-axis base 8 adopt the concave structures, so that the installation spaces of the liner motors can be saved, and the guide functions are achieved; meanwhile, the x axis 1 of the aerostatic air flotation platform and the y axis 2 of the aerostatic air flotation platform are driven according to the centre of mass, and the driving precision and the motion stability of the disclosure are improved. Moreover, the z axis 3 adopts the tubular linear motor 9, the tubular elastic balancing device 12 and the precise linear guideways (i.e., the supporting guideway assembly consisting of the guideway I 11A and the guideway II 11B), so that the magnetic field of the tubular linear motor 9 is uniformly distributed in the circumferential direction, the electromagnetic force is uniform, and the motion is stable by driving the tubular linear motor 9 according to the centre of mass. In addition, the tubular elastic balancing device 12 can balance the load of the z axis 3, ensures the operation stability of the z axis 3, does not cause the z axis 3 falling off due to the gravity thereof after the disclosure fails to be powered, thereby guaranteeing the safety. At the same time, the x axis 1 of the aerostatic air flotation platform and the y axis 2 of the aerostatic air flotation platform can complete the first-stage focusing of the industrial camera lens 15 at a high speed.

The micro-motion focusing system provided by the disclosure adopts the unique structure combining the rigid arms and the flexible arms to realize accurate positioning and mounting of the piezoelectric actuators and guarantee the accuracy of the output points of the piezoelectric actuators. Moreover, the flexure hinges in the z-direction micro-motion focusing system and the y-direction micro-motion focusing system adopt the symmetrical structures, so that the displacement can be output smoothly and stably. Furthermore, the unique structure of flexible arm in the micro-motion flexure hinge enables the micro-motion flexure hinge not to produce large-stroke displacement and to accurately output the nanoscale displacement. In addition, the y-direction micro-motion flexure hinge adopts the s-shaped structure with the set rounding angles, which can eliminate the displacement along the z direction and reduce the stress concentration. Meanwhile, the structures of the flexure hinges are not provided with intermediate transmission mechanisms, so that the mechanical friction can be eliminated, and the ultra-high displacement resolution can be obtained through the deformation of the flexure hinges. At the same time, the unique positioning structure can accurately install the accurate micro guideways and the flexure hinges. The large stroke of the two-stage focusing of the whole micro-motion focusing system is 80 μm, and the precision can reach 20 nm. Meanwhile, while the coarse focusing is performed on the macro-motion system, the micro-motion focusing system can perform pre-focusing at the same time, and after the macro-motion system cannot improve its focusing precision, the micro-motion focusing system performs the final nanoscale focusing for compensation, that is, the whole two-stage focusing work can be completed. The macro and micro motion systems are driven at the same time, so that the focusing time can be greatly reduced, and the focusing efficiency and precision can be greatly improved.

In the description of the disclosure, it should be understood that orientations or positional relationships indicated by the terms "longitudinal", "transverse", "upper", "lower", "front", "rear", "left", "right", "vertical", "horizontal", "top", "bottom", "inner", "outer", etc., are based on the orientations or positional relationships illustrated in the attached drawings, rather than indicating or implying that the indicated device or element must have a particular orientation or be constructed and operated in a particular orientation. Therefore, the above mentioned terms cannot be construed as a limitation to the disclosure.

The above embodiments only describe the illustrative implementation mode of the disclosure, and are not limited to the scope of the disclosure, and various modifications and improvements made by those of ordinary skill in the art on the technical solutions of the present disclosure shall fall within the scope of protection determined by the claims of the present disclosure without departing from the spirit of the present disclosure.

What is claimed is:

1. A macro-to-micro two-stage camera lens focusing device based on a direct-drive air floatation platform, configured to be mounted on a y axis (2) of an aerostatic air flotation platform and comprising:
a base (10), configured to be disposed on the y axis (2) of the aerostatic air flotation platform;
a z-direction macro-motion system, disposed on the base (10), wherein the z-direction macro-motion system is configured to realize macro-motion focusing of an industrial camera lens (15) along a z direction;
a micro-motion focusing system, comprising: a z-direction micro-motion focusing system and a y-direction micro-motion focusing system; wherein the z-direction micro-motion focusing system is disposed above the z-direction macro-motion system, and the y-direction micro-motion focusing system is disposed above the z-direction micro-motion focusing system; each of the z-direction micro-motion focusing system and the y-direction micro-motion focusing system adopts a structure combining rigid arms and flexible arms; and the z-direction micro-motion focusing system and the y-direction micro-motion focusing system are configured to realize micro-motion focusing along the z direction and a y direction, respectively;
wherein the z-direction micro-motion focusing system comprises:
a micro-motion platform (13), slidably connected to the base (10);
a micro-motion platform base (14), fixedly connected to the micro-motion platform (13);
a z-direction micro-motion flexure hinge (16), fixedly disposed on the micro-motion platform base (14);
a z-direction piezoceramic actuator (17), fixedly disposed in the micro-motion platform base (14) and the z-direction micro-motion flexure hinge (16); wherein a top portion of the z-direction piezoceramic actuator (17) is configured to push the z-direction micro-motion flexure hinge (16) to perform nanoscale motion through a piezoelectric effect, thereby completing the micro-motion focusing along the z direction; and
the industrial camera lens (15), disposed on the z-direction micro-motion flexure hinge (16);
wherein the y-direction micro-motion focusing system comprises:
a y-direction micro-motion flexure hinge (20), fixedly disposed on the micro-motion platform (13) and fixedly connected to the micro-motion platform base (14);
a y-direction piezoceramic mounting base (24), fixedly disposed on the micro-motion platform (13);
a y-direction piezoceramic actuator (19), fixedly disposed in the y-direction piezoceramic mounting base (24); wherein the y-direction piezoceramic actuator (19) is configured to make the micro-motion platform base (14) generate a micro displacement along the y direction by pushing a side of the micro-motion platform base (14), thereby causing the industrial camera lens (15) disposed on the micro-motion platform base (14) to produce the micro-motion focusing along the y direction; and
two y-direction micro-motion guideways (23), fixedly disposed on the micro-motion platform (13), wherein the micro-motion platform base (14) is fixedly disposed on the two y-direction micro-motion guideways (23) to complete an installation of the micro-motion platform (13) that is disposed along the z direction, and the micro-motion platform (13) is configured to perform micro motion along the y direction through the two y-direction micro-motion guideways (23);
wherein the micro-motion platform base (14) comprises:
a body (141);

wherein a bottom of the body (141) defines two first rabbets (142), and the two first rabbets (142) are disposed corresponding to the two y-direction micro-motion guideways (23);

wherein a top portion of the body (141) defines a cylindrical positioning groove (143), and the z-direction piezoceramic actuator (17) is disposed in the cylindrical positioning groove (143);

wherein the top portion of the body (141) further defines two second rabbets (144), the two second rabbets (144) are symmetrically disposed on two sides of the cylindrical positioning groove (143), and the two second rabbets (144) are designed according to a shape of the z-direction micro-motion flexure hinge (16); and wherein a middle portion of the body (141) defines a third rabbet (145), and a z-direction micro-motion guideway (25) is fixedly disposed in the third rabbet (145).

2. The focusing device as claimed in claim 1, wherein the z-direction micro-motion flexure hinge (16) comprises:

a first rigid arm (161);

two second rigid arms (162), symmetrically disposed on two sides of the first rigid arm (161);

four bridge-typed flexure hinges (163), wherein two of the four bridge-typed flexure hinges (163) are fixedly connected between a side wall of the first rigid arm (161) and one of the two second rigid arms (162), and remaining two of the four bridge-typed flexure hinges (163) are fixedly connected between another side wall of the first rigid arm (161) and the other second rigid arm (162); and wherein a bottom of the first rigid arm (161) is fixedly connected to the z-direction micro-motion guideway (25), the z-direction micro-motion guideway (25) is fixedly disposed in the third rabbet (145), the first rigid arm (161) defines a groove thereon disposed corresponding to the cylindrical positioning groove (143), the z-direction piezoceramic actuator (17) is embedded in a cavity defined by the groove and the cylindrical positioning groove (143); and the two second rigid arms (162) are fixedly connected to the two second rabbets (144), respectively.

3. The focusing device as claimed in claim 1, wherein the y-direction micro-motion flexure hinge (20) comprises:

an inner rigid arm (201), fixedly connected to the micro-motion platform (13);

an outer rigid arm (202), wherein a side of the outer rigid arm (202) is fixedly connected to the side of the micro-motion platform base (14); and four s-shaped flexure hinges (203), wherein two of the four s-shaped flexure hinges (203) are fixedly connected between a side wall of the inner rigid arm (201) and an inner side wall of the outer rigid arm (202), and remaining two of the four s-shaped flexure hinges (203) are fixedly connected between another side wall of the inner rigid arm (201) and the inner side wall of the outer rigid arm (202); and wherein the four s-shaped flexure hinges (203) are disposed symmetrically in pairs.

4. The focusing device as claimed in claim 1, wherein the z-direction macro-motion system comprises: a supporting guideway assembly, a tubular linear motor (9), and a tubular elastic balancing device (12), which are fixedly connected to the base (10);

wherein the micro-motion platform (13) is slidably connected to the supporting guideway assembly, and the supporting guideway assembly is staggered with the tubular linear motor (9) and the tubular elastic balancing device (12); and wherein the supporting guideway assembly comprises: a guideway I (11A) and a guideway II (11B), which are fixedly connected to the micro-motion platform (13); the tubular linear motor (9) is disposed between the guideway I (11A) and the guideway II (11B); and the tubular elastic balancing device (12) is disposed close to the guideway I (11A).

5. The focusing device as claimed in claim 4, wherein an elastic anti-collision limit block group is fixedly connected to the guideway I (11A) and the guideway II (11B);

wherein the elastic anti-collision limit block group comprises: an elastic anti-collision limit block I (18A), an elastic anti-collision limit block II (18B), an elastic anti-collision limit block III (18C), and an elastic anti-collision limit block IV (18D), which are fixedly connected to the micro-motion platform (13); and wherein the elastic anti-collision limit block I (18A) and the elastic anti-collision limit block IV (18D) are fixedly connected to two ends of the guideway I (11A), respectively; and the elastic anti-collision limit block II (18B) and the elastic anti-collision limit block III (18C) are fixedly connected to two ends of the guideway II (11B), respectively.

6. The focusing device as claimed in claim 1, wherein a mounting base (22) is fixedly connected to the z-direction micro-motion flexure hinge (16), and the industrial camera lens (15) is disposed on the mounting base (22).

* * * * *